F. E. DILLON.
FRUIT CONVEYER.
APPLICATION FILED FEB. 7, 1919.

1,309,119.

Patented July 8, 1919.

INVENTOR.
Friend E. Dillon.
BY N. E. Dunlap.
ATTORNEY.

UNITED STATES PATENT OFFICE.

FRIEND E. DILLON, OF DEEP RUN, OHIO.

FRUIT-CONVEYER.

1,309,119.  Specification of Letters Patent.  Patented July 8, 1919.

Application filed February 7, 1919. Serial No. 275,545.

*To all whom it may concern:*

Be it known that I, FRIEND E. DILLON, a citizen of the United States of America, and resident of Deep Run, county of Belmont, and State of Ohio, have invented certain new and useful Improvements in Fruit-Conveyers, of which the following is a specification.

This invention relates to fruit conductors, and more particularly to a conveyer tube whereby fruit may be conducted from any part of a tree to a receptacle located on the ground.

The primary object of the invention is to provide a simple and comparatively inexpensive tubular conveyer whereby gathered fruit may be conducted without injury from a tree to the ground, or to a receptacle located on the ground, and which is adapted to have its upper, or receiving, end moved from place to place and suspended in the tree for convenient reception of the fruit as picked.

A further important object of the invention is to provide a conveyer of the character mentioned which is composed of readily attachable and detachable sections and which, consequently, may be conveniently increased or decreased in length as occasion may require.

A still further object is to provide a simple and convenient form of fastener, or connecting means, for the tube sections.

With these and other objects in view, the invention resides in the features of construction, arrangement of parts and combinations of elements which will hereinafter be described, reference being had to the accompanying drawings, in which—

Referring to said drawings, in which like designating characters distinguish like parts throughout the several views—

1 indicates generally each of a plurality of tubular sections which are connected end to end to form a conveyer tube. Each section comprises a short length of canvas tubing 2 the tubular form of which is maintained by a plurality of hoops or rings 3, preferably of metal, one such ring being located at or adjacent to each end of the canvas section. Another of said rings is located substantially midway between the ends of the section. Each ring is suitably attached to the canvas section so that its position will be permanently maintained. Each section has a series of eyes or gromets 4 provided in the fabric adjacent to and located in spaced relation just inward with respect to each of the end rings. Adjacent sections are connected by means of metal snap hooks or links 5 of substantially C-shape, each of which has its open side held closed by means of a resilient tongue 5ª which is permanently attached to one terminal of the link and has its opposite end normally seated against the opposite terminal, as is most clearly shown in Fig. 4. Each link is passed through two gromets 4 which are located in vertically alined relation, one gromet in one of said sections and the other in the adjacent section.

Figure 1:
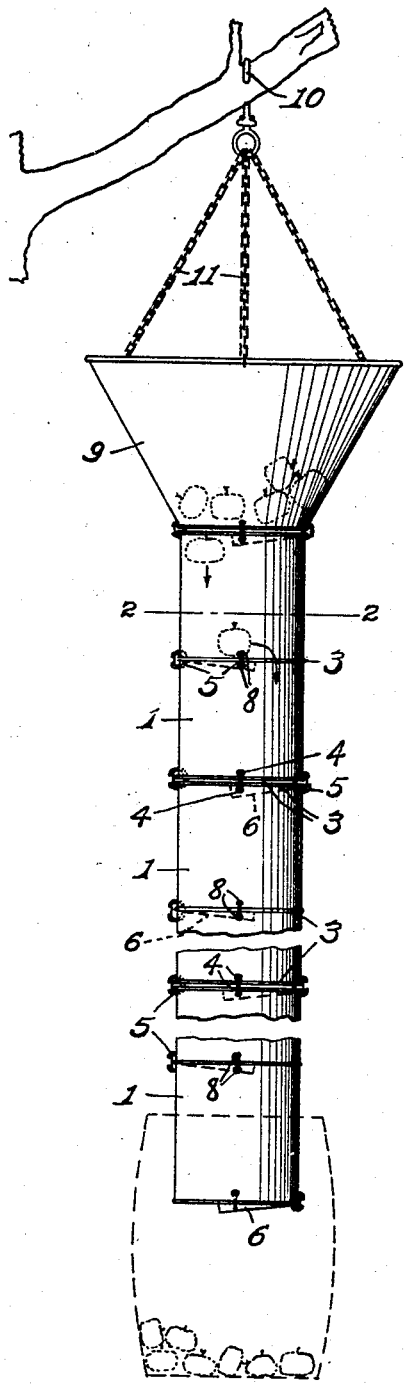
Figure 1 is a side elevation of the invention.
Figure 2:
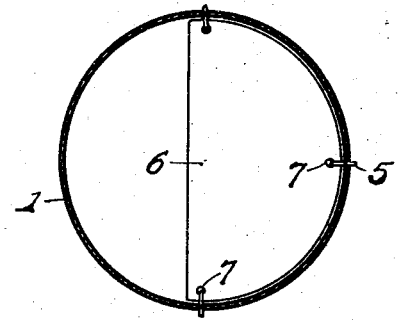
Fig. 2 is an enlarged cross section on line 2—2, Fig. 1.
Figure 3:
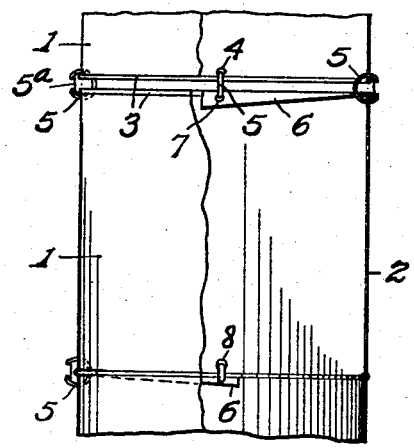
Fig. 3 is an enlarged view, partly in side elevation and partly in section, illustrating the manner of, and means for, attaching or connecting the tube sections and supporting the baffles.
Figure 4:
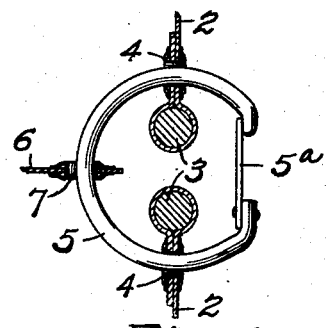
Fig. 4 is an enlarged detail section showing the attaching means.

Carried interiorly of each of the tube sections 1 are two transversely disposed baffle-like cushions 6, also composed of canvas, which are of substantially semi-circular form and are of a size to fit more or less closely the interior of the section, occupying approximately one half of the capacity of the section. Each cushion has a plurality of gromets 7 therein adjacent to its curved edge and spaced apart to correspond with the spacing of the gromets 4 in the sections so as to adapt the cushion for mounting upon the same snap links 5 by which adjacent sections are connected, as shown in Fig. 4. One of the two cushions for each section is mounted within the upper end of such section, while the second is mounted upon the ring 3 which occupies the midway position in the section. Two series of gromets 8, similar to those hereinbefore mentioned and having like spacing, are provided adjacent to the last mentioned ring, one series above and the other below said ring so as to provide means for introducing snap links for supporting the last mentioned cushion. The cushions 6 of each section are oppositely arranged, as shown, and the connected sections are so disposed relatively that the cushions are arranged alternately from end to end of the tube, means being thus provided whereby the passage of the fruit through the tube is made up of a succession of short drops from cushion to cushion, which obviously results in the fruit being allowed to ultimately enter the container in good condition—that is, without being injured by bruising.

As is obvious, the conveyer may be composed of any number of sections, addition or subtraction of sections for varying the length of the tube as desired being a matter of easy accomplishment.

Attached to the topmost section 1 is a hopper section 9 having a relatively wide mouth, said hopper being attached to said topmost section in a manner identical with that employed in connecting adjacent sections as aforesaid. A hook 10 has suspension chains 11 or the like attached at their upper ends thereto and at their opposite ends to said hopper, as shown. Said hook may be engaged over a branch of a tree or over a round of a ladder adjacent to the position of the user.

An important object had in view is the provision of a conveyer the receiving end of which may be readily shifted from one position to another in a tree so as to be always within convenient reach of the user, and this object is obviously attained by the construction described.

What is claimed is—

1. A fruit conveyer of the character described comprising a plurality of similar tube sections, each consisting of a length of canvas tubing and rings carried by said tubing for maintaining its tubular condition, one such ring being located adjacent to each end of each section, baffle-like cushions alternately disposed and arranged in stepped relation within each section, each of said sections having gromets therein in spaced relation adjacent to said rings, and each of said cushions having gromets therein in like spaced relation, and snap links received in the gromets of adjacent ends of said sections for connecting the latter, and also received in the gromets of an adjacent cushion for supporting the latter.

2. A fruit conveyer of the character described comprising a plurality of similar tube sections, each consisting of a length of canvas tubing and rings carried by said tubing for maintaining its tubular condition, one such ring being located adjacent to each end of each section and another ring being located intermediate the ends of the section, baffle-like cushions of approximately semicircular form disposed within each section, one such cushion being located adjacent to the intermediate ring and another adjacent to one of the end rings, said cushion being alternately arranged, gromets arranged in spaced relation in the tubing adjacent to each of said rings and gromets arranged in like relation adjacent to the curved edge of each cushion, and snap links detachably connecting adjacent tube sections and supporting an adjacent cushion, said links being received respectively by the gromets of said sections and those of said cushion, each section also having gromets at each side of and adjacent to the intermediate ring, and snap links received by the last mentioned gromets and by those of the adjacent cushion for supporting the latter.

In testimony whereof, I affix my signature in presence of two subscribing witnesses.

FRIEND E. DILLON.

Witnesses:
J. S. WALTON,
H. E. DUNLAP.

Copies of this patent may be obtained for five cents each, by addressing the "Commissioner of Patents, Washington, D. C."